(12) United States Patent
Nelson et al.

(10) Patent No.: US 11,577,333 B2
(45) Date of Patent: Feb. 14, 2023

(54) INDIRECT LASER BRAZING OF SIC/SIC CMCS FOR MANUFACTURING AND REPAIR

(71) Applicants: Rolls-Royce Corporation, Indianapolis, IN (US); Trustees of the Colorado School of Mines, Golden, CO (US)

(72) Inventors: Scott Nelson, Carmel, IN (US); Raymond Xu, Carmel, IN (US); Stephen Liu, Golden, CO (US); Juan Carlos Madeni, Littleton, CO (US); Brian Paul Rodgers, Lakewood, CO (US)

(73) Assignees: ROLLS-ROYCE CORPORATION, Indianapolis, IN (US); TRUSTEES OF THE COLORADO SCHOOL OF MINES, Golden, CO (US)

( * ) Notice: Subject to any disclaimer, the term of this patent is extended or adjusted under 35 U.S.C. 154(b) by 520 days.

(21) Appl. No.: 16/744,345

(22) Filed: Jan. 16, 2020

(65) Prior Publication Data

US 2021/0220935 A1 Jul. 22, 2021

(51) Int. Cl.
*B23K 1/005* (2006.01)
*B23K 35/32* (2006.01)
(Continued)

(52) U.S. Cl.
CPC .......... *B23K 1/0056* (2013.01); *B23K 1/0008* (2013.01); *B23K 26/324* (2013.01);
(Continued)

(58) Field of Classification Search
CPC .. B23K 1/0056; B23K 1/0008; B23K 26/324; B23K 35/30; B23K 35/32; B23K 35/0233; B23K 35/025; B23K 2103/52; B23K 1/20; B23K 1/005; C04B 35/80; C04B 2235/524; C04B 2235/5244; C04B 2235/5248;
(Continued)

(56) References Cited

U.S. PATENT DOCUMENTS

6,268,069 B1 * 7/2001 Ohashi .................. C04B 37/026
228/123.1
9,624,786 B2 4/2017 Xu et al.
(Continued)

*Primary Examiner* — Jimmy Chou
*Assistant Examiner* — Yi Hao
(74) *Attorney, Agent, or Firm* — Crowell & Moring LLP (57) ABSTRACT

A method of connecting two CMC substrates that includes providing two substrates; placing one substrate approximate to the other substrate, such that at least a portion of the two substrates overlap and define a brazing area; placing a brazing material approximate the brazing area; defining a primary raster pattern that encompasses the brazing area and a portion of the two substrates outside the brazing area; defining a secondary raster pattern that encompasses the brazing area; allowing a laser to scan the primary raster pattern to preheat the brazing area to a temperature below the brazing material's melting point; allowing the laser to scan the secondary raster pattern to heat the brazing area to a temperature that is above the brazing material's melting point; melting and allowing the brazing material to flow within the brazing area; and cooling the brazing area to form a brazed joint connecting the two substrates.

20 Claims, 4 Drawing Sheets

(51) Int. Cl.
  *B23K 35/30*  (2006.01)
  *B23K 1/00*  (2006.01)
  *C04B 35/80*  (2006.01)
  *B23K 26/324*  (2014.01)
  B23K 35/02  (2006.01)
  B23K 103/00  (2006.01)

(52) U.S. Cl.
  CPC .............. *B23K 35/30* (2013.01); *B23K 35/32* (2013.01); *C04B 35/80* (2013.01); *B23K 35/025* (2013.01); *B23K 35/0233* (2013.01); *B23K 2103/52* (2018.08)

(58) Field of Classification Search
  CPC ........ C04B 2235/665; C04B 2237/126; C04B 2237/127; C04B 2237/16; C04B 2237/341; C04B 2237/365; C04B 2237/366; C04B 2237/38; C04B 37/006
  See application file for complete search history.

(56) References Cited

U.S. PATENT DOCUMENTS

| | | | |
|---|---|---|---|
| 2014/0163717 A1* | 6/2014 | Das | B22F 7/062 700/119 |
| 2014/0328615 A1* | 11/2014 | Chaumat | B23K 1/19 501/15 |
| 2015/0165536 A1* | 6/2015 | Chaumat | A61L 31/022 428/408 |
| 2016/0023957 A1 | 1/2016 | Landwehr et al. | |
| 2016/0207129 A1* | 7/2016 | Ritchey | B23K 1/19 |
| 2016/0244374 A1* | 8/2016 | Nelson | C04B 37/008 |
| 2019/0031570 A1 | 1/2019 | Nelson et al. | |
| 2022/0065029 A1* | 3/2022 | Andersen | E06B 3/6736 |

* cited by examiner

INDIRECT LASER BRAZING OF SIC/SIC CMCS FOR MANUFACTURING AND REPAIR

TECHNICAL FIELD

This disclosure relates generally to a method of joining ceramic matrix composite (CMC) substrates. More specifically, this disclosure relates to a method of using indirect laser heating to promote the formation of a brazed joint during the manufacturing or repair of a ceramic matrix composite (CMC) component.

BACKGROUND

The statements in this section merely provide background information related to the present disclosure and may not constitute prior art.

Ceramic matrix composite (CMC) substrates are often used in aerospace engine applications because of the stability exhibited by their mechanical and chemical properties when exposed to high temperatures. For example, gas turbine engines require high temperature stability for structural components that are used in or near the combustion zone, such as airfoils, blades and vanes. The use of various metals or metal alloys in these applications is undesirable because of their limited ability to operate over a prolonged time in such an environment.

Often the coupling together of two or more ceramic matrix composite (CMC) substrates to form a CMC component is required during a manufacturing process or as part of a subsequent repair undertaking. In fact, the joining of CMC substrates has been identified by the industry as being an essential "toolbox technology" for the repair and manufacturing of CMC components. However, the coupling of CMC substrates can be challenging for a variety of reasons. Two of these reasons, for example, include: (1) a lack of uniform heat distribution throughout the surface area of the CMC substrates that are being joined together; and (2) the formation of low-melting point eutectic phases in the braze joints and/or areas adjacent to the braze joints due to reactions between the brazing material and free silicon present in the CMC substrates. The susceptibility to failure and oxidation during operation at high temperatures of any brazed joints and surrounding areas resulting from a manufacturing or repair process is undesirable.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

For purposes of promoting an understanding of the principles of the present disclosure, reference will now be made to the embodiments illustrated in the drawings, and specific language will be used to describe the same. It should be understood that throughout the description, corresponding reference numerals indicate like or corresponding parts and features. One skilled in the art will further understand that any properties reported herein represent properties that are routinely measured and may be obtained by multiple different methods. The methods described herein represent one such method and other methods may be utilized without exceeding the scope of the present disclosure.

No limitation of the scope of the present disclosure is intended by the illustration and description of certain embodiments herein. In addition, any alterations and/or modifications of the illustrated and/or described embodiment(s) are contemplated as being within the scope of the present disclosure. Further, any other applications of the principles of the present disclosure, as illustrated and/or described herein, as would normally occur to one skilled in the art to which the disclosure pertains, are contemplated as being within the scope thereof.

The present disclosure provides a method to join ceramic matrix composite (CMC) substrates using a laser beam to indirectly heat the CMC substrates in order to promote melting of the brazing material and form a brazed joint. The brazing material may be placed outside of the joint as a paste or in an equivalent form with the subsequent heating of the CMC substrates melting the brazing material such that it flows into the volume between the faying surfaces of the CMC substrates and forms the brazed joint. When desirable, the brazing material may be placed as a foil or as a pre-sintered preform (PSP) between the faying surfaces. In this case, the simple conduction of heat from the substrate to the foil or PSP will melt the brazing material and form the brazed joint.

For the purpose of this disclosure, brazing is a process through which two materials, e.g., CMC substrates, of the same or different composition are joined together by melting a third material between them at an elevated temperature. Various fluxes, which are known in the art, may be added to the brazing material or filler in order to enhance the flow and wettability characteristics exhibited by the brazing material. The melting point of the brazing or filler material is kept below the melting point of the CMC substrates in order to limit incipient melting of the substrates. The limited melting and/or dissolution of the CMC substrates represents one of the advantages associated with the use of a brazing process. Several other advantages associated with the brazing process of the present disclosure include the ability to join substrates that are dissimilar in composition, join substrates that differ in geometry, reduce the presence of residual stress and distortion relative to other methods of joining (e.g., welding, etc.), and to preserve the ability to design parts having tight tolerances.

A heated zone is formed in the brazing process, but such zone is not as extensive as required by a fusion process due to the lower temperatures used. A brazed joint is formed using a thin layer of the brazing or filler material placed between the surfaces of the CMC substrates to be joined. The surfaces to be joined may also be called the "faying" surfaces. A certain amount of the molten filler located between the faying surfaces may be drawn outside of the joined region by capillary action to form a fillet, which can either act as a further reinforcement for the joint or initiate one or more cracks due to brittle intermetallic formation.

The use of a laser to heat the CMC substrates during a brazing process offers multiple advantages over the use of a furnace to heat the CMC substrates. These advantages include, for example, faster processing times, greater process flexibility, and reduced energy usage. A laser heat source is particularly attractive for CMC substrates formed from silicon carbide due to its high coupling efficiency when exposed to common laser wavelengths. Additionally, the focused application of heat only in or near the area to be joined prevents thermal damage to the rest of the CMC component, making it easier to incorporate multiple CMC substrates and the joining thereof in the design of the CMC component.

The following description is merely exemplary in nature and is in no way intended to limit the present disclosure or the application or use thereof. For example, the method of forming a brazing joint between two ceramic matrix composite (CMC) substrates according to the teachings contained herein is described throughout the present disclosure in conjunction with CMC substrates having a reaction bonded silicon carbide (RB-SiC) matrix in order to more fully illustrate the method and the use thereof. The incorporation and use of such a method of forming a lap joint between CMC substrates comprising other types of matrix materials in the preparation of a CMC component is contemplated to be within the scope of the present disclosure. For example, the CMC substrates used in the method of the present disclosure may include, but not be limited to, matrix materials of RB-SiC, sintered silicon carbide (SiC), silicon nitride ($Si_3N_4$), silica ($SiO_2$), silicon oxynitride (SiON), silicon oxycarbide (SiOC), nitride bonded silicon carbide (NBSiC), or a combination thereof. Alternatively, the CMC substrates used in the method of the present disclosure include a matrix material of RB-SiC or sintered SiC. These ceramic matrix composite substrates may be reinforced with multiple different types of ceramic fibers, including without limitation silicon carbide fibers, silicon nitride fibers, carbon fibers, or a combination thereof; alternatively, the ceramic fiber imbedded within the ceramic matrix material is a silicon carbide fiber.

Silicon carbide CMC substrates are excellent candidates for use in structural CMC components because of the stability associated with their physical, chemical, and mechanical properties at ambient and high temperatures. Silicon carbide performs well under conditions and situations wherein creep would represent the primary failure mechanism. The properties exhibited by reaction-bonded silicon carbide (RB-SiC) are comparable to silicon carbide produced using other synthetic techniques. For example, RB-SiC is known to exhibit excellent creep performance under extreme temperature conditions.

Figure 1:
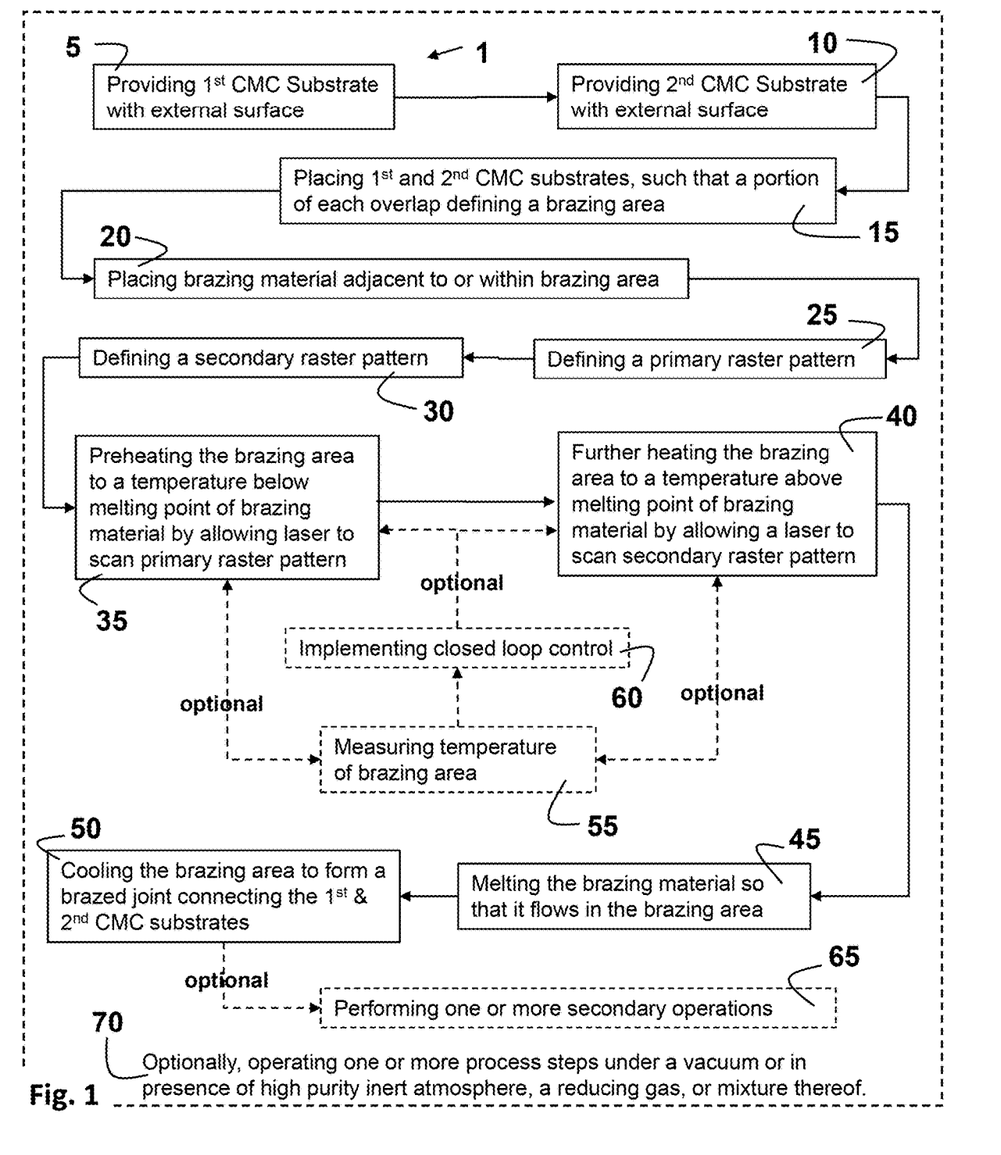
FIG. 1 is a flowchart of a method for joining two ceramic matrix composite (CMC) substrates according to the teachings of the present disclosure.

Referring to FIG. 1, a method 1 of connecting two ceramic matrix composite (CMC) substrates together during the manufacturing or repair of a CMC component is provided. This method 1 generally comprises the following steps:

providing 5 a first CMC substrate having an external surface;
providing 10 a second CMC substrate having an external surface;
placing 15 the first CMC substrate in close proximity to the second CMC substrate, such that at least a portion of the external surface of the first CMC substrate overlaps at least a portion of the external surface of the second CMC substrate, thereby, defining a brazing area between the first CMC substrate and the second CMC substrate;
placing 20 a brazing material adjacent to or within the brazing area; the brazing material having a melting point;
defining 25 a primary raster pattern;
defining 30 a secondary raster pattern;
allowing 35 a laser to scan over the primary raster pattern in order to preheat the brazing area to a predetermined temperature that is below the melting point of the brazing material;
allowing 40 the laser to scan over the secondary raster pattern in order to further heat the brazing area to a temperature that is above the melting point of the brazing material;
melting 45 the brazing material, such that the brazing material flows within the brazing area; and
cooling 50 the brazing area to form a brazed joint that connects the first and second CMC substrates together.

In this method 1, the primary raster pattern encompasses the brazing area, as well as a portion of the external surface of the first CMC substrate and a portion of the external surface of the second CMC substrate that are outside of the brazing area. In comparison, the secondary raster pattern only encompasses the brazing area.

Figure 2A:
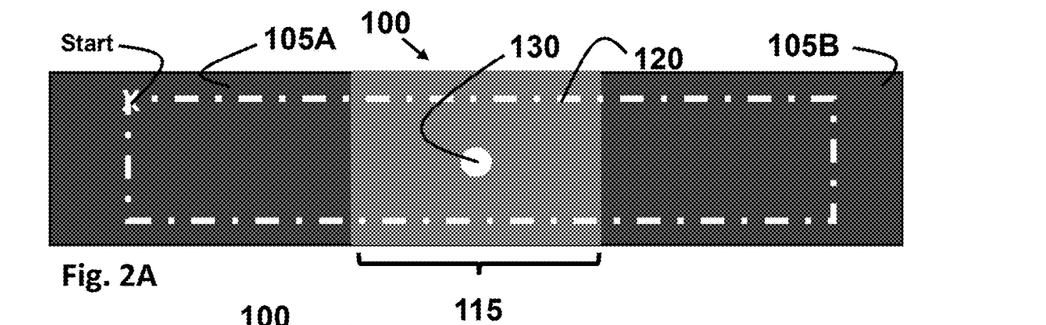
FIG. 2A is a top down view of a lap joint formed by joining two CMC substrates highlighting a primary raster pattern used to preheat the brazing area according to the teachings of the present disclosure.
Figure 2B:
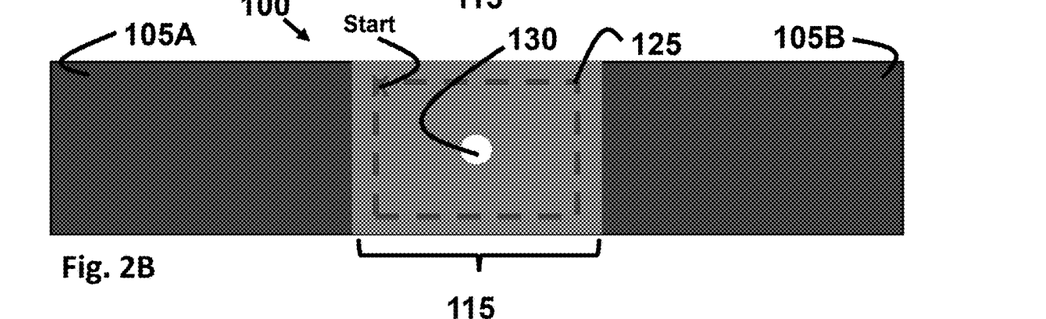
FIG. 2B is a top down view of the lap joint joining the CMC substrates of FIG. 2A highlighting a secondary raster pattern used to heat the brazing area according to the teachings of the present disclosure.
Figure 2C:
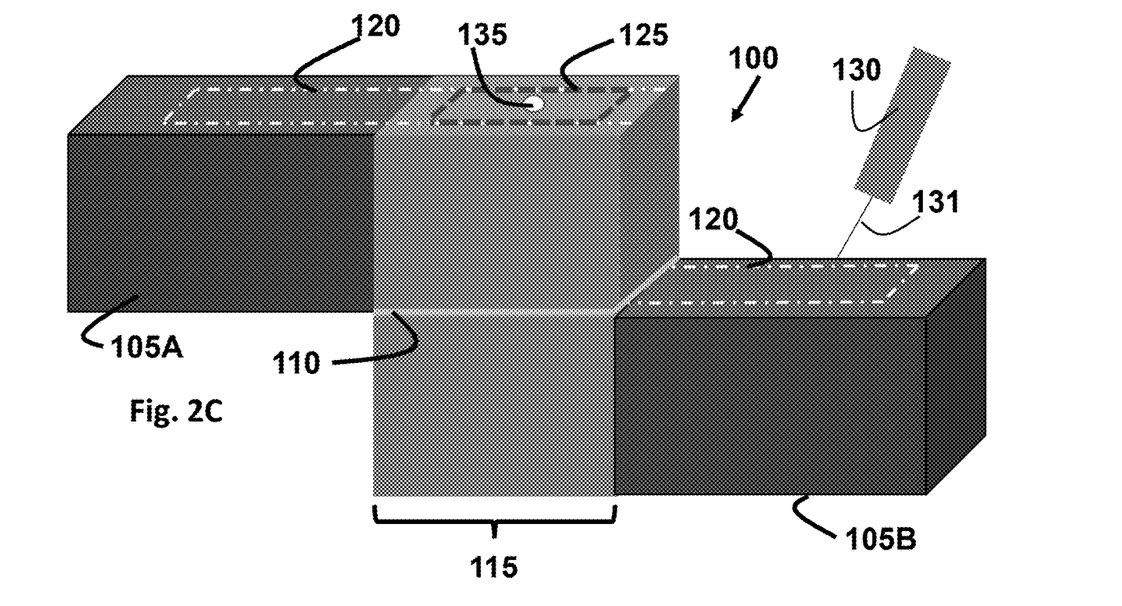
FIG. 2C is perspective view of the lap joint formed by joining the two CMC substrates highlighting the primary and secondary raster patterns shown in FIGS. 2A and 2B.

Referring now to FIGS. 2A, 2B, and 2C, a schematic representation of a CMC component 100 is provided in which two CMC substrates 105A, 105B are joined by a brazing or filler material 110 in a brazing area 115 formed by overlapping a portion of the external surface of each CMC substrate 105A, 105B. This brazing area 115 may be further defined by the volume of space or gap created between the overlapped surfaces of each CMC substrate 105A, 105B that is subsequently filled with the brazing material 110 to form a brazed joint. The brazing material 110 may be placed adjacent to or outside the brazing area 115 as a paste, slurry, powder, or equivalent form with subsequent heating of the CMC substrates 105A, 105B melting the brazing material 110 and allowing it to flow into the brazing area 115 or faying volume to form the brazed joint. Alternatively, the brazing material 110 may also be placed between the faying surfaces or brazing area 115 as a foil, ribbon, pre-sintered preform (PSP), or equivalent form with only the conduction of heat through the CMC substrates 105A, 105B being required to melt the brazing material 110. The placement of the brazing material 110 may be done either prior to heating or during the heating process.

The CMC substrates 105A, 105B are heated by a laser 130 scanning over a primary raster pattern 120 followed by scanning over a secondary raster pattern 125. A non-contact pyrometer 130 may be used in conjunction with different time and power combinations at a constant laser intensity as part of a thermal calibration methodology to establish raster patterns that are capable of providing a uniform heat distribution throughout the brazing area 115. In heating the CMC substrates 105A, 105B, the laser 130 never directly impinges upon the brazing material 110. Rather, all of the heat for the brazing process is delivered indirectly through the heating of the CMC substrates 105A, 105B by the systematic movement of an unfocused laser beam 131 on the upper surface of the CMC substrate 105A used to form the brazed joint and the area adjacent to the joint on the upper surface of the lower CMC substrate 105B (see primary raster pattern 120 in FIGS. 2A & 2C).

Uniform heating of the brazing area 115 is achieved by careful use of calibrated tool paths that allow for controlled cooling with pauses and travel speeds designed to maintain even heating of the full brazing area 115. Initially a primary raster pattern 120 is executed or scanned by the laser 130 that encompasses a large area surrounding and including the brazing area 115. The laser 130 scans over the primary raster pattern 120 in order to preheat the brazing area 115 by raising the temperature of the brazing area 115 to a level that is slightly below the melting point of the brazing material 110. A secondary raster pattern 125 is then executed or scanned by the laser 130 in order to raise the temperature of the brazing area 115 to a level that allows the brazing material 110 to melt, flow, and bond to the CMC substrates 105A, 105B. The melting point of the brazing material may be within the range of about 1,150° C. to about 1,650° C.

The secondary raster pattern 125 is focused directly over the brazing area 115. The preheating of the brazing area 115 by the laser 130 scanning the primary raster pattern 120 and the further heating of the brazing area 115 by the laser 130 scanning the secondary raster pattern 125 provides for a uniform heat distribution throughout the brazing area 115. A pyrometer 135 may be used during the operation of the process to monitor and verify the temperature of the brazing area 115 achieved by scanning the laser 130 over the primary raster pattern 120 and secondary raster pattern 125.

For the purpose of this disclosure, the term "uniform heat distribution" describes a temperature condition with minimal variation, such as ±5° C.; alternatively, ±3° C.; alternatively, ±1° C.; alternatively, ±0.5° C. over the specified area. When desirable, a uniform heat distribution may also be defined by demonstrating control over the variation in temperature expressed as a percentage of the measured temperature. For example, as the measured temperature is controlled to be within ±10%; alternatively, ±5%; alternatively, ±3%; alternatively, ±1%.

Referring once again to FIG. 1, the method 1 may further include measuring 55 the temperature of the brazing area after at least one of preheating of the brazing area by the laser scanning 35 the primary raster pattern and the further heating of the brazing area by the laser scanning 40 the secondary raster pattern. The measurement of temperature may be accomplished by any methodology known in the art, including but not limited to, noncontact pyrometry. When desirable, a closed loop control system may be incorporated with the use of the one or more pyrometers in order to measure or monitor temperature and to implement control 60 by altering the laser parameters, raster pattern, or heating time, thereby, ensuring that the brazing temperature is accurately achieved regardless of the type of CMC substrate used, the composition of the brazing material, or the joint/part geometry. The measurement of temperature at or near the brazing area may be taken at the surface of the CMC substrates, within the CMC substrates, or within the center of the brazing material located in the brazing area.

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one source", "one or more sources", and "source(s)" may be used interchangeably and are intended to have the same meaning.

During the practical application of the method 1, a brazed joint is formed in brazing areas with such a narrow gap between the faying surfaces of the two CMC substrates that the brazing or filler material often does not need to be preplaced between the faying surfaces. Instead, capillary flow may be used to move the brazing material throughout the gap and sometimes result in an overflow outside of the gap to form a fillet. In order for the brazing material to adequately flow throughout the gap, the material should be able to wet the surface of the CMC substrates. If the wettability between the surface of the CMC substrates and liquid brazing material is unfavorable, then the brazing material will not flow and fully fill the gap.

Brazing materials having a low surface energy will more readily wet the surface of a CMC substrate. Active metal brazing is a technique wherein an element with a higher affinity for at least one of the elements comprising the CMC substrate is added to the brazing material. For SiC:SiC CMC substrates, an element, such as titanium and/or vanadium, may be added. Both titanium and vanadium have a higher affinity for the carbon atoms in silicon carbide (SiC) rather than the silicon atoms, thereby, allowing for the formation of titanium and vanadium carbides. Thus, active metal brazing modifies the surface of the CMC substrates being joined to be more compatible with the liquid filler or brazing material. In other words, the joining process is accomplished through the formation of a reaction layer, as well as the diffusion of the active metal element into the CMC substrate.

In this respect, the brazing material of the present disclosure, may comprise a composition that includes silicon at a concentration ranging from about 48 at. % to about 66 at. %, titanium at a concentration ranging from about 1 at. % to about 35 at. %, and one or more additional elements selected from aluminum, cobalt, vanadium, nickel, chromium, or a combination thereof, such that the one or more additional elements accounts for the balance of the composition. In this embodiment, the composition of the brazing material exhibits a melting point that ranges from about 1,150° C. to less than 1,300° C. Upon forming the brazed joint, the brazing material may include, without limitation, at least one silicide phase selected from the group comprising, consisting essentially of, or consisting of $TiSi_2$, $CoSi_2$, $VSi_2$, $(Ni,Co)Si_2$, $(Ti,Cr)Si_2$, and $Ti_4Ni_4Si_7$. Additional information concerning the brazing material may be found in co-pending U.S. patent application Ser. No. 15/951,707 filed Apr. 12, 2018, the entire content of which is hereby incorporated by reference.

Alternatively, the brazing material may comprise a homogeneous mixture of two or more materials, one of the two or more materials being a brazing alloy comprising silicon and another of the two or more materials being a high melting point material or alloy, wherein the homogeneous mixture of the two or more materials is selected from the group consisting of (in wt. %): Ti-9Si (5%)+71Si—Cr (95%), 75Si—Ti (97%)+C (3%), 75Si—Ti (97%)+B (3%), 75Si—Ti (50%)+71Si—Cr (50%), 75Si—Ti (50%)+Ti-43Cr (50%), 75Si—Ti (50%)+12.5Si—Co (50%), and Ti-25Cr-23Si (97%)+C (3%). In this embodiment, the composition of the brazing material exhibits a melting point that ranges from about 1,000° C. to about 1,650° C.; alternatively, from about 1,150° C. to about 1,650° C.; alternatively from about 1,350° C. to about 1,650° C. Additional information concerning the brazing material may be found in U.S. Pat. No. 9,624,786 issued Apr. 12, 2017, the entire content of which is hereby incorporated by reference.

For the purpose of this disclosure the terms "about" and "substantially" are used herein with respect to measurable values and ranges due to expected variations known to those skilled in the art (e.g., limitations and variability in measurements).

For the purpose of this disclosure, the recitations of numerical ranges by endpoints include the endpoints and all numbers within that numerical range. For example, a concentration ranging from 40% by weight to 60% by weight includes concentrations of 40% by weight, 60% by weight, and all concentrations there between (e.g., 40.1 wt. %, 41 wt. %, 45 wt. %, 50 wt. %, 52.5 wt. %, 55 wt. %, 59 wt. %, etc.).

The term "laser" as used herein is an acronym for "Light Amplified by Stimulated Emission of Radiation". Three basic characteristics of a beam 131 of light created by a laser 130 distinguishes the beam 131 from other photon or light sources. More specifically, a laser beam 131 is monochromatic, phase coherent, and collimated. The term monochromatic means that the photons, which comprise the beam 131, possess the same wavelength and energy. The term, "phase coherency" refers to the peaks and troughs of each photon being in alignment with each other, while the term "collimation" refers to the photons traveling parallel to one another instead of being emitted radially in all directions.

Referring once again to FIGS. 2A, 2B, and 2C, the laser 130 used in the present disclosure may be any type of laser known in the art that does not result in the fracturing or cracking of either the first or second CMC substrates 105A, 105B. Generally, this laser 130 will generate an unfocused laser beam 131 operated at an intensity and for a time duration that limits the creation of any damage to the CMC substrates 105A, 105B. Thus, knowledge of the beam 131 parameters is desirable in order to determine the threshold for heating the CMC substrates 105A, 105B without damaging them. Cracking is only one of the damage mechanisms that may occur. The creation of surface porosity due to thermal exposure may also occur. The use of a primary raster pattern 120 and a secondary raster pattern 125 over which the laser 130 scans allows for better control of temperatures and mitigates the creation of surface damage.

The diameter and the intensity of the laser beam 131 have an impact on the ability to minimize the damage induced in the CMC substrates 105A, 105B. A focused beam having a high energy density may cause significant damage to a CMC substrate. In addition, an uncontrolled beam diameter allows laser radiation to impinge upon regions intended to be heated only through conduction from the initially heated region, thereby, resulting in a non-uniform heat distribution. The temperature in the brazing area 115 may be controlled by balancing heat input and heat loss as a function of temperature, with the heat input by the laser 130 being constant for a given power. Therefore, each given beam power will produce a maximum reachable temperature for a given joint/part geometry with a predetermined amount of time being required for the heat to equilibrate throughout the sample and reach a steady state. One skilled in the art will understand that the localized heating of a substrate by irradiation with the use of a laser beam is quite different from a conventional system that controls ambient temperature.

A laser supplies heat directly to the surface of the material upon which they impinge. Heat then flows in and out of the material by a mixture of conduction, convection, and radiation. In order to induce the desired temperature within the brazing area, the power level exhibited by the laser may be any level conventionally available including, but not limited to greater than 100 W; alternatively, about 500 W or less.

The intensity of the beam may be adjusted by changing the focal distance between the laser and the external surface of the CMC substrates. In other words, the intensity of the beam may be kept constant for different power levels by changing the focal distance. Typically, a higher beam power may use a longer focal distance, such that the intensity is equivalent to the use of a lower beam power over a shorter focal distance. The scanning of the laser beam over the raster patterns may be done at a varied or a constant speed. Examples of typical scan speeds include, without limitation, 1.0 cm/sec, 2.5 cm/sec, and 4.0 cm/sec.

In order to obtain the desired temperature in the brazing area, the scanning of the primary and secondary raster patterns may be done multiple times in a cyclic fashion. When desirable, the laser beam may also be pulsed at any predetermined or desired interval. The overall exposure time that the CMC substrates are exposed to the laser beam may range from milliseconds (ms) to seconds. Alternatively, the exposure time may be greater than 1 ms; alternatively, greater than 50 ms; alternatively, less than about 600 seconds; alternatively, in the range from about 1 ms to about 60 seconds, with the length of the time being dependent upon parameters, such as the intensity of the laser beam and the diameter of the beam.

At low enough intensities or short enough exposure times, CMC substrates, such as those made with RB-SiC, can survive laser radiation. The use of lower intensity and shorter exposure times both address the same potential cause of fracture, namely, the formation of a severe thermal gradient resulting in the presence of a strain gradient. The laser intensity and exposure time necessary to avoid fracture or cracking of a RB-SiC substrate is shown in Table 1. The use of a laser beam intensity of 261 W/mm$^2$ is observed not to create any damage to the surface of the substrate at all exposure times tested.

The use of primary (preheat) raster patterns and secondary raster patterns are necessary to fully melt the filler or brazing material and allow the brazing material to interact with the CMC substrate. The scanning of the primary raster pattern by the laser is designed to spread heat over the surface of the CMC substrates in order to preheat the substrate, such that the brazing area reaches a steady state temperature that is below the melting point of the brazing material. The temperature difference between this steady state preheat temperature in the brazing area and the melting temperature of the brazing material may be about 10° C. or higher; alternatively, at least 15° C.; alternatively, about 25° C. or higher; alternatively, less than 50° C.; alternatively, between about 10° C. and about 50° C. The scanning of the primary raster pattern (e.g., preheating) alone is inadequate for the brazing process to be completed.

TABLE 1

| Intensity (W/mm$^2$) | Exposure Time (ms) | Result |
|---|---|---|
| 233,000 | 100 | Damaged |
| 112,000 | 50 | Damaged |
| 978 | 100 | Undamaged |
| 978 | 500 | Undamaged |
| 978 | 2,500 | Fractured |
| 740 | 2,000 | Fractured |
| 520 | 5,000 | Fractured |
| 261 | 2,500 | Undamaged |
| 261 | 10,000 | Undamaged |
| 261 | 25,000 | Undamaged |
| 261 | 60,000 | Undamaged |

Rather, the scanning of a secondary raster pattern is necessary in order to allow the filler or brazing material to fully melt and adhere to the surface of the CMC substrates in the brazing area. However, performing only scanning of a secondary raster pattern by a laser in the brazing area (e.g., near the area to be joined) without the use of preheating results in large measurable thermal gradients, which may lead to an inconsistent flow behavior exhibited by the brazing material. These thermal gradients may compromise the strength of the joints and possibly lead to a lack of joining in cooler areas. The use of the preheating step increases the overall temperature exhibited by the entire CMC substrates, thereby, reducing the presence of these thermal gradients during the scanning of the secondary raster patterns, which may lead to a more consistent and stronger joint. Although the use of a heat source (e.g., convection oven, etc.) other than a laser may also function for preheating the CMC substrates, the use of a laser is more cost effective and efficient.

The scanning of a secondary raster pattern by the laser is necessary to deliver more heat to a localized or confined space within the brazing area. However, too much time spent by the laser on scanning the secondary raster pattern could raise the temperature to a level that is too high, thereby, resulting in surface damage to the substrate, loss of brazing material to vaporization, and/or an increase in the depth of diffusion of various chemical elements into the substrate exceeding desirable and/or allowable amounts. The use of a preheat step prior to scanning the secondary raster pattern reduces the amount of time needed for the scanning of the secondary raster pattern because the brazing area is already near the melting point of the brazing material. The laser scanning of the secondary raster pattern should be limited to increasing the temperature of the brazing area to a level that is less than 150° C. higher than the melting point of the brazing material; alternatively, less than 100° C. higher than the melting point of the brazing material; alternatively, less than about 75° C. higher; alternatively, 50° C. or less higher than the melting point of the brazing material.

The presence of solidified brazing material outside of the brazing area or brazed joint may occur for multiple reasons. First, a portion of the brazing material may diffuse through a section of the CMC substrate. Second, a portion of the brazing material may flow out of the gap during joining and solidify on an exterior surface of the CMC substrate. The brazing material may be forced to flow out of the gap created in the brazing area due to the weight of the substrate or the occurrence of silicon expansion during solidification overcoming the capillary action and surface tension of the brazing material, which work to keep the material within the gap. Referring once again to FIG. 1, when desirable, the method further may further comprise performing 65 one or more secondary operations on the connected first CMC and second CMC substrates in order to remove any brazing material or fillet attached thereto that is outside of the brazing area. Such secondary operations may include, but not be limited to, grinding, sanding, brushing, or polishing with or without the presence of an abrasive medium.

The occurrence of oxidation may also pose a concern when forming a brazing joint despite the low concentration of oxygen in the atmosphere. More specifically, the occurrence of oxidation can prevent fillet formation, deteriorate mechanical performance, and influence overflow behavior. Several viable methods, which may be implemented when desirable to resolve this concern regarding oxidation, include further excluding the presence of oxygen during the brazing operation; and adding a reducing gas to the atmosphere. In order to exclude oxygen from the brazing operation, the method must either be conducted under at least a partial vacuum or in the presence of a high purity inert atmosphere (e.g., Ar, Xe, etc.). The presence of a reducing gas mixture, such as an argon-hydrogen (Ar—H) mixture, for example, may mitigate the occurrence of oxidation. Thus, when desirable, the method 1 as described in FIG. 1 may further comprise operating 70 one or more process steps under at least a partial vacuum or in the presence of an inert gas, a reducing gas, or a mixture thereof.

Figure 3:
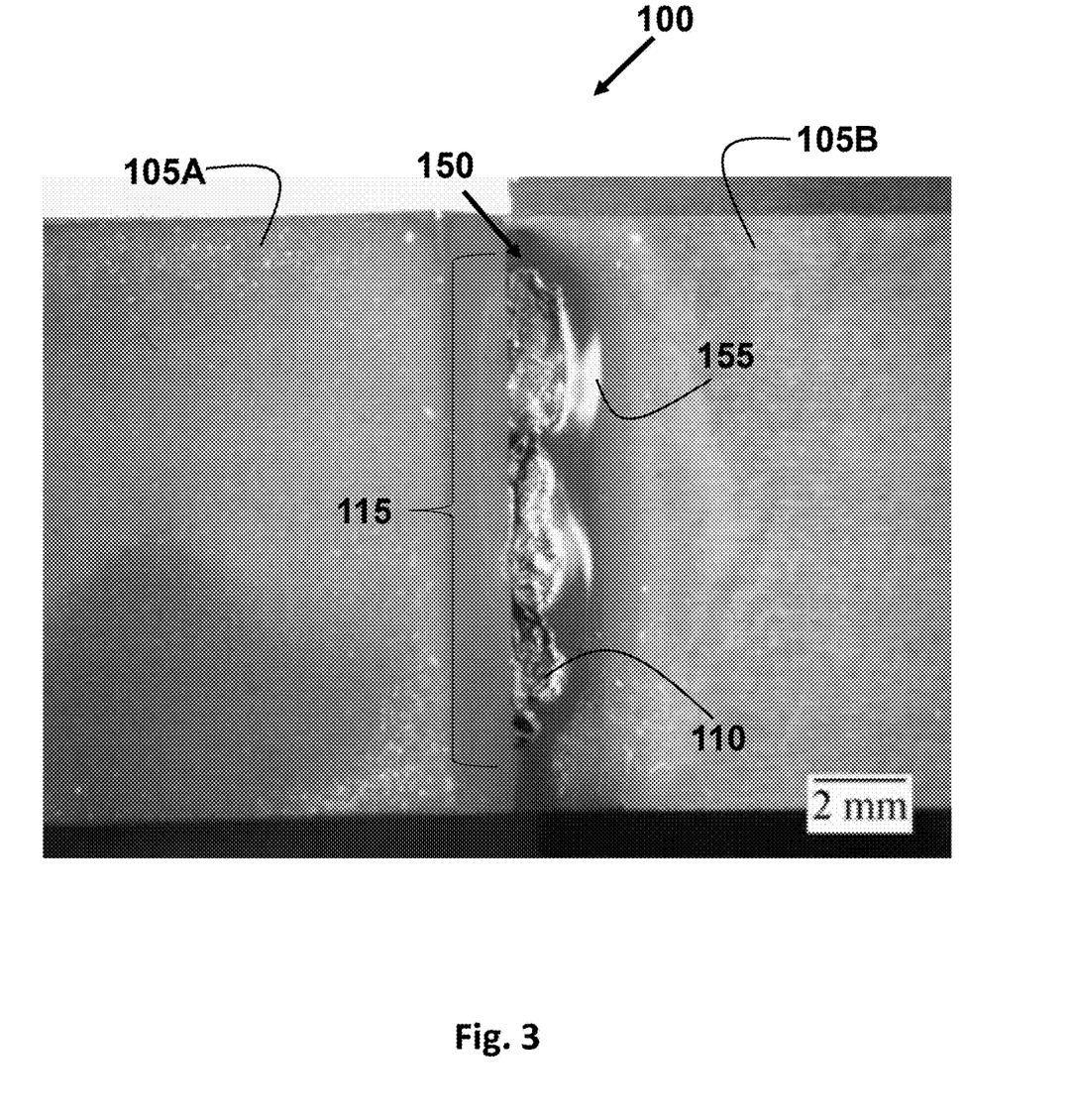
FIG. 3 is a pictorial representation of a brazing joint connecting two CMC substrates successfully formed according to the method of FIG. 1.
Figure 4:
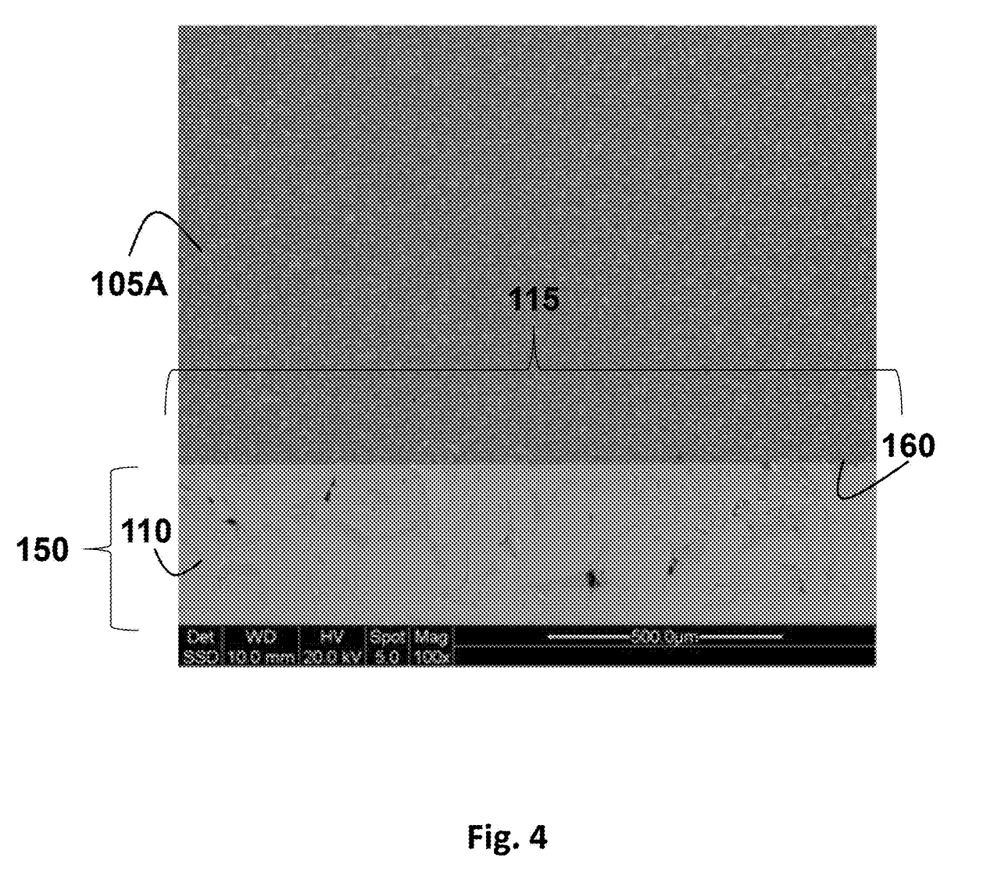
FIG. 4 is a backscatter electron micrograph of an RB-SiC CMC substrate and brazed joint formed according to the method of FIG. 1.

Referring now to FIGS. 3 and 4, the method described above and in FIG. 1 can successfully be used to achieve the formation of a brazed joint 150 that connects two CMC substrates 105A, 105B to form a CMC component 100. The brazed joint 150 is filled with brazing material 110 in the brazing area 115. The interface 160 between the brazing material 110 and the CMC substrate 105A is shown in FIG. 4 to be relatively smooth without the presence of any voids. The formation of one or fillets 155 forced out of the brazing area may also be observed (see FIG. 3). The example shown in FIG. 3 was prepared in the presence of an Ar—H reducing gas in order to reduce or minimize the occurrence of oxidation.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The subject-matter of the disclosure may also relate, among others, to the following Aspects:

1. A method of connecting two ceramic matrix composite (CMC) substrates together during the manufacturing or repair of a CMC component; the method comprising:
    providing a first CMC substrate having an external surface;
    providing a second CMC substrate having an external surface;
    placing the first CMC substrate in close proximity to the second CMC substrate, such that at least a portion of the external surface of the first CMC substrate overlaps at least a portion of the external surface of the second CMC substrate, thereby, defining a brazing area between the first CMC substrate and the second CMC substrate;
    placing a brazing material adjacent to or within the brazing area; the brazing material having a melting point;
    defining a primary raster pattern, the primary raster pattern encompassing the brazing area, as well as a portion of the external surface of the first CMC substrate and a portion of the external surface of the second CMC substrate that are outside of the brazing area;
    defining a secondary raster pattern, the secondary raster pattern encompassing the brazing area;
    allowing a laser to scan over the primary raster pattern in order to preheat the brazing area to a predetermined temperature that is below the melting point of the brazing material;
    allowing the laser to scan over the secondary raster pattern in order to further heat the brazing area to a temperature that is above the melting point of the brazing material;
    melting the brazing material, such that the brazing material flows within the brazing area; and cooling the brazing area to form a brazed joint that connects the first and second CMC substrates together.

2. The method according to Aspect 1, wherein the preheating of the brazing area by the laser scanning the primary raster pattern and the further heating of the brazing area by the laser scanning the secondary raster pattern provides for a uniform heat distribution throughout the brazing area.

3. The method according to any of Aspects 1 or 2, wherein the method further comprises the step of measuring the temperature of the brazing area after at least one of preheating of the brazing area by the laser scanning the primary raster pattern and the further heating of the brazing area by the laser scanning the secondary raster pattern.

4. The method according to Aspect 3, wherein the method further comprises a closed loop system configured to adjust one or more laser parameters, the primary raster pattern, the secondary raster pattern, or heating time based on the measured temperature of the brazing area.

5. The method according to any of Aspects 3 or 4, wherein the temperature of the brazing area is measured by pyrometry.

6. The method according to any of Aspects 1-5, wherein the brazing material is a paste, a powder, a foil, or a pre-sintered preform (PSP).

7. The method according to any of Aspects 1-6, wherein the first CMC substrate and the second CMC substrate comprise silicon carbide fibers, silicon nitride fibers, carbon fibers, or a combination thereof dispersed in a matrix material of RB-SiC, sintered silicon carbide (SiC), silicon nitride ($Si_3N_4$), silica ($SiO_2$), silicon oxynitride (SiON), silicon oxycarbide (SiOC), nitride bonded silicon carbide (NBSiC), or a combination thereof.

8. The method according to Aspect 7, wherein at least one of the first CMC substrate and the second CMC substrate comprises silicon carbide fibers in a silicon carbide matrix (SiC/SiC) material.

9. The method according to any of Aspects 1-8, wherein the brazing material comprises a composition that includes silicon at a concentration ranging from about 48 at. % to about 66 at. %, titanium at a concentration ranging from about 1 at. % to about 35 at. %, and one or more additional elements selected from aluminum, cobalt, vanadium, nickel, chromium, or a combination thereof, such that the one or more additional elements accounts for the balance of the composition.

10. The method according to Aspect 9, wherein the composition of the brazing material exhibits a melting point that ranges from about 1,150° C. to less than 1,300° C.

11. The method according to any of Aspects 1-8, wherein the composition of the brazing material comprises:

a homogeneous mixture of two or more materials, one of the two or more materials being a brazing alloy comprising silicon and another of the two or more materials being a high melting point material or alloy, wherein the homogeneous mixture of the two or more materials is selected from the group consisting of (in wt. %): Ti-9Si (5%)+71Si—Cr (95%), 75Si—Ti (97%)+C (3%), 75Si—Ti (97%)+B (3%), 75Si—Ti (50%)+71Si—Cr (50%), 75Si—Ti (50%)+Ti-43Cr (50%), 75Si—Ti (50%)+12.5Si—Co (50%), and Ti-25Cr-23Si (97%)+C (3%).

12. The method according to Aspect 11, wherein the composition of the brazing material exhibits a melting point that ranges from about 1,300° C. to about 1,650° C.

13. The method according to any of Aspects 1-12, wherein the laser comprises an unfocused laser beam operated at an intensity and for a time duration that does not result in the fracturing or cracking of the first CMC substrate and the second CMC substrate.

14. The method according to any of Aspects 1-13, wherein the method further comprises performing one or more secondary operations on the connected first CMC and second CMC substrates in order to remove any brazing material or fillet attached thereto outside of the brazing area.

15. The method according to any of Aspects 1-14, wherein the method further comprises operating one or more of the process steps under at least a partial vacuum or in the presence of an inert gas, a reducing gas, or a mixture thereof.

16. A method of connecting two silicon carbide (SiC/SiC) ceramic matrix composite (CMC) substrates together during the manufacturing or repair of a SiC/SiC CMC component; the method comprising:

providing a first SiC/SiC CMC substrate having an external surface;

providing a second SiC/SiC CMC substrate having an external surface;

placing the first SiC/SiC CMC substrate in close proximity to the second SiC/SiC CMC substrate, such that at least a portion of the external surface of the first SiC/SiC CMC substrate overlaps at least a portion of the external surface of the second SiC/SiC CMC substrate, thereby, defining a brazing area between the first SiC/SiC CMC substrate and the second SiC/SiC CMC substrate;

placing a brazing material adjacent to or within the brazing area; the brazing material having a melting point that ranges from about 1,150° C. to about 1,650° C.;

defining a primary raster pattern, the primary raster pattern encompassing the brazing area, as well as a portion of the external surface of the first SiC/SiC CMC substrate and a portion of the external surface of the second SiC/SiC CMC substrate that are outside of the brazing area;

defining a secondary raster pattern, the secondary raster pattern encompassing the brazing area;

allowing a laser to scan over the primary raster pattern in order to preheat the brazing area to a predetermined temperature that is below the melting point of the brazing material;

allowing the laser to scan over the secondary raster pattern in order to further heat the brazing area to a temperature that is above the melting point of the brazing material;

melting the brazing material, such that the brazing material flows within the brazing area; and cooling the brazing area to form a brazed joint that connects the first SiC/SiC CMC and second SiC/SiC CMC substrates together;

wherein the preheating of the brazing area by the laser scanning the primary raster pattern and the further heating of the brazing area by the laser scanning the secondary raster pattern provides for a uniform heat distribution throughout the brazing area.

17. The method according to Aspect 16, wherein the method further comprises operating one or more of the process steps under at least a partial vacuum or in the presence of an inert gas, a reducing gas, or a mixture thereof.

18. The method according to any of Aspects 16 or 17, wherein the brazing material is a paste, a powder, a foil, or a pre-sintered preform (PSP); the brazing material comprising:

a composition that includes silicon (Si) at a concentration ranging from about 48 at. % to about 66 at. %, titanium at a concentration ranging from about 1 at. % to about 35 at. %, and one or more additional elements selected from aluminum, cobalt, vanadium, nickel, chromium, or a combination thereof, such that the one or more additional elements accounts for the balance of the composition; or a composition that comprises a homogeneous mixture of two or more materials in powder form, one of the two or more materials being a brazing alloy comprising silicon and another of the two or more materials being a high melting point material or alloy, wherein the homogeneous mixture of the two or more materials in powder form is selected from the group consisting of (in wt. %): Ti-9Si (5%)+71Si—Cr (95%), 75Si—Ti (97%)+C (3%), 75Si—Ti (97%)+B (3%), 75Si—Ti (50%)+71Si—Cr (50%), 75Si—Ti (50%)+Ti-43Cr (50%), 75Si—Ti (50%)+12.5Si—Co (50%), and Ti-25Cr-23Si (97%)+C (3%).

19. The method according to any of Aspects 16-18, wherein the method further comprises the step of measuring the temperature of the brazing area by pyrometry after at least one of preheating of the brazing area by the laser scanning the primary raster pattern and the further heating of the brazing area by the laser scanning the secondary raster pattern.

20. The method according to Aspect 19, wherein the method further comprises a closed loop system configured to adjust one or more of laser parameters, the primary raster pattern, the secondary raster pattern, or heating time based on the measured temperature of the brazing area The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of connecting two ceramic matrix composite (CMC) substrates together during manufacture or repair of a CMC component; the method comprising:
   providing a first CMC substrate having an external surface;
   providing a second CMC substrate having an external surface;
   placing the first CMC substrate in close proximity to the second CMC substrate, such that at least a portion of the external surface of the first CMC substrate overlaps at least a portion of the external surface of the second CMC substrate, thereby, defining a brazing area between the first CMC substrate and the second CMC substrate;
   placing a brazing material adjacent to or within the brazing area; the brazing material having a melting point;
   defining a primary raster pattern, the primary raster pattern encompassing the brazing area, as well as a portion of the external surface of the first CMC substrate and a portion of the external surface of the second CMC substrate that are outside of the brazing area;
   defining a secondary raster pattern, the secondary raster pattern encompassing the brazing area;
   allowing a laser to scan over the primary raster pattern in order to preheat the brazing area to a predetermined temperature that is below the melting point of the brazing material;
   allowing the laser to scan over the secondary raster pattern in order to further heat the brazing area to a temperature that is above the melting point of the brazing material;
   melting the brazing material, such that the brazing material flows within the brazing area; and
   cooling the brazing area to form a brazed joint that connects the first and second CMC substrates together.

2. The method according to claim 1, wherein the preheating of the brazing area by the laser scanning the primary raster pattern and the further heating of the brazing area by the laser scanning the secondary raster pattern provides for a uniform heat distribution throughout the brazing area.

3. The method according to claim 1, wherein the method further comprises a step of measuring the temperature of the brazing area after at least one of preheating of the brazing area by the laser scanning the primary raster pattern and the further heating of the brazing area by the laser scanning the secondary raster pattern.

4. The method according to claim 3, wherein the method further comprises a closed loop system configured to adjust one or more laser parameters, the primary raster pattern, the secondary raster pattern, or heating time based on the measured temperature of the brazing area.

5. The method according to claim 3, wherein the temperature of the brazing area is measured by pyrometry.

6. The method according to claim 1, wherein the brazing material is a paste, a powder, a foil, or a pre-sintered preform (PSP).

7. The method according to claim 1, wherein the first CMC substrate and the second CMC substrate comprise silicon carbide fibers, silicon nitride fibers, carbon fibers, or a combination thereof dispersed in a matrix material of RB-SiC, sintered silicon carbide (SiC), silicon nitride ($Si_3N_4$), silica ($SiO_2$), silicon oxynitride (SiON), silicon oxycarbide (SiOC), nitride bonded silicon carbide (NBSiC), or a combination thereof.

8. The method according to claim 7, wherein at least one of the first CMC substrate and the second CMC substrate comprises silicon carbide fibers in a silicon carbide matrix (SiC/SiC) material.

9. The method according to claim 1, wherein the brazing material comprises a composition that includes silicon at a concentration ranging from about 48 at. % to about 66 at. %, titanium at a concentration ranging from about 1 at. % to about 35 at. %, and one or more additional elements selected from aluminum, cobalt, vanadium, nickel, chromium, or a combination thereof, such that the one or more additional elements accounts for the balance of the composition.

10. The method according to claim 9, wherein the composition of the brazing material exhibits a melting point that ranges from about 1,150° C. to less than 1,300° C.

11. The method according to claim 1, wherein the composition of the brazing material comprises:
   a homogeneous mixture of two or more materials, one of the two or more materials being a brazing alloy comprising silicon and another of the two or more materials being a high melting point material or alloy, wherein the homogeneous mixture of the two or more materials is selected from the group consisting of (in wt. %): Ti-9Si (5%)+71Si—Cr (95%), 75Si—Ti (97%)+C (3%), 75Si—Ti (97%)+B (3%), 75Si—Ti (50%)+71Si—Cr (50%), 75Si—Ti (50%)+Ti-43Cr (50%), 75Si—Ti (50%)+12.5Si—Co (50%), and Ti-25Cr-23Si (97%)+C (3%).

12. The method according to claim 11, wherein the composition of the brazing material exhibits a melting point that ranges from about 1,300° C. to about 1,650° C.

13. The method according to claim 1, wherein the laser comprises an unfocused laser beam operated at an intensity and for a time duration that does not result in the fracturing or cracking of the first CMC substrate and the second CMC substrate.

14. The method according to claim 1, wherein the method further comprises performing one or more secondary operations on the connected first CMC and second CMC substrates in order to remove any brazing material or fillet attached thereto outside of the brazing area.

15. The method according to claim 1, wherein the method further comprises operating one or more of the process steps under at least a partial vacuum or in the presence of an inert gas, a reducing gas, or a mixture thereof.

16. A method of connecting two silicon carbide (SiC/SiC) ceramic matrix composite (CMC) substrates together during manufacture or repair of a SiC/SiC CMC component; the method comprising:
 providing a first SiC/SiC CMC substrate having an external surface;
 providing a second SiC/SiC CMC substrate having an external surface;
 placing the first SiC/SiC CMC substrate in close proximity to the second SiC/SiC CMC substrate, such that at least a portion of the external surface of the first SiC/SiC CMC substrate overlaps at least a portion of the external surface of the second SiC/SiC CMC substrate, thereby, defining a brazing area between the first SiC/SiC CMC substrate and the second SiC/SiC CMC substrate;
 placing a brazing material adjacent to or within the brazing area; the brazing material having a melting point that ranges from about 1,150° C. to about 1,650° C.;
 defining a primary raster pattern, the primary raster pattern encompassing the brazing area, as well as a portion of the external surface of the first SiC/SiC CMC substrate and a portion of the external surface of the second SiC/SiC CMC substrate that are outside of the brazing area;
 defining a secondary raster pattern, the secondary raster pattern encompassing the brazing area;
 allowing a laser to scan over the primary raster pattern in order to preheat the brazing area to a predetermined temperature that is below the melting point of the brazing material;
 allowing the laser to scan over the secondary raster pattern in order to further heat the brazing area to a temperature that is above the melting point of the brazing material;
 melting the brazing material, such that the brazing material flows within the brazing area; and
 cooling the brazing area to form a brazed joint that connects the first SiC/SiC CMC and second SiC/SiC CMC substrates together;
 wherein the preheating of the brazing area by the laser scanning the primary raster pattern and the further heating of the brazing area by the laser scanning the secondary raster pattern provides for a uniform heat distribution throughout the brazing area.

17. The method according to claim 16, wherein the method further comprises operating one or more of the process steps under at least a partial vacuum or in the presence of an inert gas, a reducing gas, or a mixture thereof.

18. The method according to claim 16, wherein the brazing material is a paste, a powder, a foil, or a pre-sintered preform (PSP); the brazing material comprising:
 a composition that includes silicon (Si) at a concentration ranging from about 48 at. % to about 66 at. %, titanium at a concentration ranging from about 1 at. % to about 35 at. %, and one or more additional elements selected from aluminum, cobalt, vanadium, nickel, chromium, or a combination thereof, such that the one or more additional elements accounts for the balance of the composition; or
 a composition that comprises a homogeneous mixture of two or more materials in powder form, one of the two or more materials being a brazing alloy comprising silicon and another of the two or more materials being a high melting point material or alloy, wherein the homogeneous mixture of the two or more materials in powder form is selected from the group consisting of (in wt. %): Ti-9Si (5%)+71Si—Cr (95%), 75Si—Ti (97%)+C (3%), 75Si—Ti (97%)+B (3%), 75Si—Ti (50%)+71Si—Cr (50%), 75Si—Ti (50%)+Ti-43Cr (50%), 75Si—Ti (50%)+12.5Si—Co (50%), and Ti-25Cr-23Si (97%)+C (3%).

19. The method according to claim 16, wherein the method further comprises a step of measuring the temperature of the brazing area by pyrometry after at least one of preheating of the brazing area by the laser scanning the primary raster pattern and the further heating of the brazing area by the laser scanning the secondary raster pattern.

20. The method according to claim 19, wherein the method further comprises a closed loop system configured to adjust one or more of laser parameters, the primary raster pattern, the secondary raster pattern, or heating time based on the measured temperature of the brazing area.

* * * * *